US012595678B1

(12) United States Patent
Ouyang

(10) Patent No.: US 12,595,678 B1
(45) Date of Patent: Apr. 7, 2026

(54) FENCE PILLAR HEAD CONNECTOR

(71) Applicant: Shunyou Ouyang, Guangdong (CN)

(72) Inventor: Shunyou Ouyang, Guangdong (CN)

( * ) Notice: Subject to any disclaimer, the term of this patent is extended or adjusted under 35 U.S.C. 154(b) by 0 days.

(21) Appl. No.: 19/363,475

(22) Filed: Oct. 20, 2025

(51) Int. Cl.
*E04H 17/00* (2006.01)
*F21V 33/00* (2006.01)

(52) U.S. Cl.
CPC .......... *E04H 17/006* (2021.01); *F21V 33/006* (2013.01)

(58) Field of Classification Search
CPC .......... E04H 17/006; E04H 17/20; E01F 9/60; E01F 9/615; E01F 9/617; F21V 33/006
See application file for complete search history.

(56) References Cited

U.S. PATENT DOCUMENTS 3,222,509 A * 12/1965 Thedford .............. E04H 17/017 362/267
6,039,307 A * 3/2000 De Zen ............... E04H 17/1439 256/66
6,585,398 B1 * 7/2003 Haddad ..................... F21V 5/02 362/253
6,722,637 B2 * 4/2004 Burkart ................. E04H 17/017 256/19
7,143,556 B2 * 12/2006 Hales .................... E04H 17/006 52/301
7,473,016 B2 * 1/2009 Flaherty .................. F21S 8/083 362/555
7,997,560 B2 * 8/2011 Bergdoll ............... E04H 17/066 256/67
8,186,129 B2 * 5/2012 Noirot .................... B65D 59/06 52/301
9,863,612 B2 * 1/2018 Burt ........................ F21V 21/04
10,100,551 B2 * 10/2018 Pacheco ................ E04H 17/006
10,161,161 B2 * 12/2018 Yin ..................... E04H 17/1408
10,190,329 B2 * 1/2019 Kobelt .................... E04H 12/04
10,273,713 B2 * 4/2019 Sachakov ............. A01M 29/12
D954,326 S * 6/2022 Liao ............................. D25/135
D959,720 S * 8/2022 Liao ............................. D25/135
D969,376 S * 11/2022 Zeng .............................. D26/85
11,655,975 B2 * 5/2023 Sohn ................... F21V 37/0016 362/101
11,814,861 B2 * 11/2023 Martins ................. E04H 17/006
11,898,736 B2 * 2/2024 Spiro .................... F21V 29/763
(Continued)

FOREIGN PATENT DOCUMENTS

DE 202020102886 U1 * 9/2020 ............. H02S 40/38
KR 20070101740 A * 10/2007 .............. E01F 9/615
(Continued)

*Primary Examiner* — Jonathan P Masinick
(74) *Attorney, Agent, or Firm* — Hawaii Patent Services; Nathaniel K. Fedde; Kenton N. Fedde

(57) ABSTRACT

The present disclosure relates to a fence pillar head connector, which achieves radial position adjustment of the connector to accommodate pillars of different cross-sections through the sliding engagement between the radially arranged sliding grooves on the bottom surface of the main panel and the sliding blocks of the connection assembly. The locking plate is provided with through holes for reinforcement with bolts or pins, while the top surface features a rotating snap-fit connection for covers and accommodates lamps or decorations, enhancing installation adaptability, connection reliability, maintenance convenience, and significantly reducing production and inventory management costs.

20 Claims, 12 Drawing Sheets

(56) References Cited

U.S. PATENT DOCUMENTS

| | | | | |
|---|---|---|---|---|
| 12,092,317 | B1 * | 9/2024 | Marques | F21V 37/0004 |
| D1,060,785 | S * | 2/2025 | Qu | D26/67 |
| 2002/0125468 | A1 * | 9/2002 | Fischer | E04H 17/006<br>256/19 |
| 2005/0247920 | A1 * | 11/2005 | Burkart | F21S 9/037<br>256/1 |
| 2013/0114244 | A1 * | 5/2013 | Formico | F21V 33/006<br>29/469 |
| 2015/0240515 | A1 * | 8/2015 | Davis | E04H 17/21<br>256/1 |

FOREIGN PATENT DOCUMENTS

| | | | | |
|---|---|---|---|---|
| KR | 20110119136 | A * | 11/2011 | E04H 17/006 |
| KR | 101205544 | B1 * | 11/2012 | F21V 33/006 |

* cited by examiner

A

FENCE PILLAR HEAD CONNECTOR

TECHNICAL FIELD

The present disclosure relates to the technical field of fence protective components, particularly to a fence pillar head connector.

BACKGROUND

In the production and installation technology of fences, the pillar head connector, as a core component connecting various parts of the fence, has a structural design whose rationality directly affects the convenience and adaptability of fence installation. Currently, widely used fence pillar head connectors on the market mostly adopt a fixed square structure. The overall dimensions of such connectors are preset as fixed values during production, completely lacking any adjustable mechanism. Each type of this connector can only match fence pillars of specific cross-sectional dimensions, exhibiting strong uniformity in structural form and dimensional parameters.

When faced with fence pillars of varying specifications and cross-sectional dimensions, the limitations of such fixed-structure connectors become evident: Due to their lack of adjustability, a single model of connector cannot accommodate a plurality of pillar specifications. This forces users to prepare corresponding connectors for different pillar sizes in advance during fence installation, significantly increasing costs for mold development and product customization during production, while also complicating inventory management-requiring separate storage planning and management for connectors of different specifications. Moreover, from an installation efficiency perspective, on-site workers must frequently switch between different connectors to match various pillars, reducing installation convenience and overall construction efficiency, thereby hindering the smooth execution of fence installation projects. For a long time, the series of issues caused by insufficient connector adaptability have persistently constrained cost control and efficiency improvements in fence production and installation.

SUMMARY

The present disclosure provides a fence pillar head connector to address the issues raised in the background above.

To achieve the aforementioned object of the present disclosure, the present disclosure adopts the following technical solution:

A fence pillar head connector comprises: a main panel configured to be mounted to an end face of a fence pillar head, the main panel comprising a mounting surface facing the fence pillar head; at least one sliding groove formed on the mounting surface of the main panel; at least one connection assembly, comprising an abutment plate coupled to the fence pillar. The abutment plate comprises a sliding block that is slidably engaged with the sliding groove, enabling the at least one connection assembly to move relative to the main panel through the sliding of the sliding block along the sliding groove, thereby adjusting the position of the abutment plate to accommodate fence pillar heads of different cross-sectional dimensions.

A fence pillar head connector comprises: a main panel configured to be mounted to an end face of a fence pillar head, the main panel comprising a mounting surface facing the fence pillar head; at least one sliding groove formed on the mounting surface of the main panel; at least one connection assembly, comprising an abutment plate coupled to the fence pillar. The abutment plate comprises a sliding block that is slidably engaged with the sliding groove, enabling the at least one connection assembly to move relative to the main panel through the sliding of the sliding block along the sliding groove, thereby adjusting the position of the abutment plate to accommodate fence pillar heads of different cross-sectional dimensions; the connection assembly further comprises a locking plate that is provided with a fastener receiving part configured to secure the connection assembly to the fence pillar head when the connection assembly is in a target position.

A fence pillar head connector comprises: a main panel configured to be mounted to an end face of a fence pillar head, the main panel comprising a mounting surface facing the fence pillar head and a buckle seat; at least one sliding groove formed on the mounting surface of the main panel; at least one connection assembly, comprising an abutment plate coupled to the fence pillar; wherein the abutment plate comprises a sliding block that is slidably engaged with the sliding groove, allowing the connection assembly to move relative to the main panel through the sliding of the sliding block along the sliding groove, thereby adjusting the position of the abutment plate to accommodate fence pillar heads of different cross-sectional dimensions; a cover assembly, comprising an engagement part, the cover assembly being engaged with the buckle seat through the engagement part to be releasably fixed to the main panel.

The beneficial effects of the present disclosure compared to the prior art are as follows:

The sliding fit between the sliding groove on the bottom surface of the main panel and the sliding block of the connection assembly allows flexible radial adjustment of the connection assembly along the groove, overcoming the size limitations of traditional fixed connectors and achieving broad compatibility with fence pillar heads of varying cross-sectional dimensions, enhancing user convenience; the through hole on the locking plate of the connection assembly can accommodate bolts or pins to interface with the matching connection structure of the fence, further securing the relative position of the connection assembly to the fence from a locking perspective, effectively resisting loosening caused by vibration or external forces, significantly improving connection reliability and structural durability; the buckle seat on the top surface of the main panel and the engagement part at the bottom of the cover assembly form a rotational snap-fit structure, enabling quick installation and removal of the cover assembly without additional fasteners, simplifying assembly and maintenance operations; additionally, the internal accommodation space of the cover assembly allows flexible installation of lamps or decorative elements, providing illumination around the fence while enriching the appearance of the fence pillar head and enhancing scene adaptability.

BRIEF DESCRIPTION OF DRAWINGS

The drawings, which form part of this application, are intended to provide further understanding of the present disclosure. The illustrative embodiments and the descriptions thereof serve to explain the present disclosure and do not constitute undue limitations thereof. In the drawings.

Figure 1:
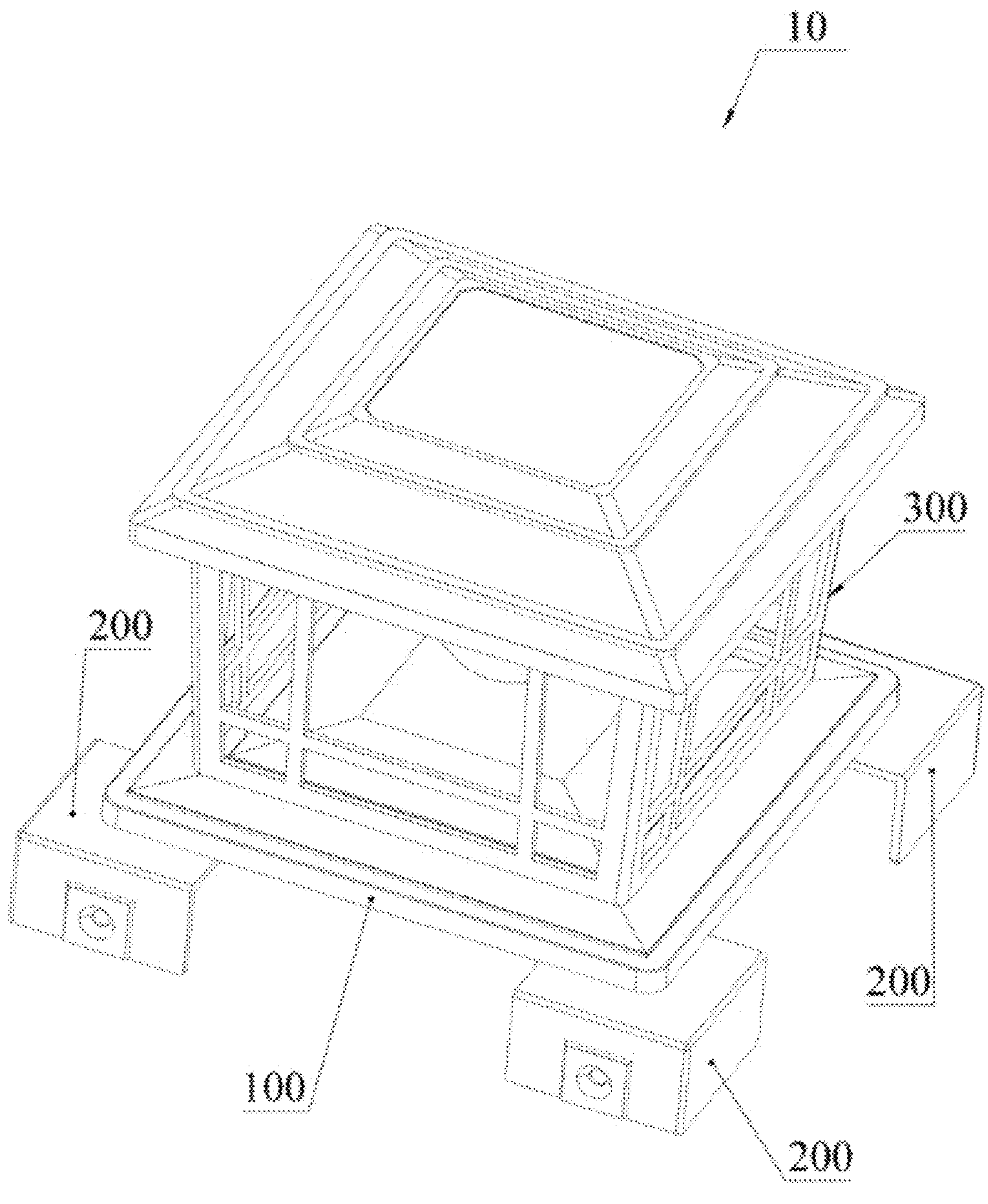
FIG. 1 is a perspective schematic view of an embodiment provided by the present disclosure.

Reference signs: Fence Pillar head connector (10); Main Panel (100); Mounting Surface (110); Sliding Groove (111); Upper Groove Segment (1111); Lower Groove Segment (1112); Buckle Seat (120); Clamping Block (121); Baffle (130); First connecting hole (131); Connection Assembly (200); Abutment Plate (210); Sliding Block (211); Upper Sliding Part (2111); Lower Sliding Part (2112); Locking Plate (220); First Locking Plate (221); Second Locking Plate (222); Through Hole (2211); Fixing plate (230); Second connecting hole (231); Connecting plate (240); Cover Assembly (300); Engagement Part (310); Clamping Groove (311).

DESCRIPTION OF EMBODIMENTS

The technical solution in the embodiment of the present disclosure will be clearly and completely described below with reference to the drawings. Obviously, the described embodiment is part of, rather than all of the embodiments of the present disclosure. The following description of at least one exemplary embodiment is illustrative in nature and is in no way intended to limit the present disclosure, its application or uses. Based on the embodiments in the present disclosure, all other embodiments obtained by those skilled in the art without creative work belong to the scope of protection of the present disclosure.

It should be noted that the terminology used here is only for describing specific embodiments, and is not intended to limit exemplary embodiments according to the present application. As used herein, the singular form is also intended to include the plural form unless the context clearly indicates otherwise. Furthermore, it should be appreciated that when the terms "comprising" and/or "including" are used in this specification, they specify the presence of features, steps, operations, devices, components and/or combinations thereof.

Unless otherwise specified, the relative arrangement of components and steps, numerical expressions and numerical values set forth in these embodiments do not limit the scope of the present disclosure. At the same time, it should be appreciated that for the convenience of description, the dimensions of various parts shown in the drawings are not drawn according to the actual scale relationship. Techniques, methods and equipment known to those skilled in the art may not be discussed in detail, but in appropriate cases, they should be regarded as part of the authorization specification. In all the examples shown and discussed herein, any specific values should be interpreted as illustrative, and not as limiting. Therefore, other examples of exemplary embodiments may have different values. It should be noted that similar numbers and letters indicate similar items in the following drawings, therefore once an item is defined in one drawing, it does not need to be further discussed in subsequent drawings.

In the present disclosure, addressing the issue that existing fence pillar head connectors lack a size adjustment mechanism, making it difficult to accommodate fence pillar heads of different cross-sectional dimensions, which requires users to equip specific connectors for different pillars during installation, significantly increasing production costs and inventory management complexity while reducing installation efficiency, a fence pillar head connector is provided. Through the collaborative structure of the main panel and the connection assembly, wherein the connection assembly utilizes the sliding fit between the sliding groove on the bottom surface of the main panel and its own sliding block, the position can be flexibly adjusted along the sliding groove to adapt to fence pillar heads of different specifications. Below, the specific embodiments of the fence pillar head connector of the present disclosure will be described in detail with reference to the accompanying drawings.

As shown in FIG. 1, the present disclosure provides a fence pillar head connector 10, comprising a main panel 100, a connection assembly 200 and a cover assembly 300. The main panel 100 is configured as a square plate structure, serving as the core load-bearing component of the fence pillar head connector 10. During installation, the panel surface of the main panel 100 is connected to the end face of the fence pillar head, providing a stable mounting and positioning reference for the connection assembly 200 and the cover assembly 300. Through its square plate structure, the main panel 100 can adapt to the corresponding mounting surface of the fence pillar head, offering an orderly structural layout support for the assembly of various components, thereby ensuring that the fence pillar head and the connector, along with other related parts, form a stable and reliable connected whole. In other embodiments, the shape of the main panel 100 is not limited to square but can also be configured as a circular plate structure or, based on actual application scenarios and requirements, polygonal plate structures such as triangular or regular hexagonal. Specifically, the shape of the main panel 100 can be selected according to the cross-sectional shape of the fence pillar head it adapts to, ensuring a more fitting and matched assembly between the main panel 100 and the mounting surface of the fence pillar head, thereby guaranteeing the adaptability and connection stability between the fence pillar head connector 10 and fence pillar heads of different cross-sectional shapes.

In other embodiments (not shown), to reduce transportation and storage space, the main panel 100 adopts a hinged folding design: hinge surfaces are arranged along one or more preset fold lines on the panel body of the main panel 100, dividing the main panel 100 into at least two foldable segments; when folded, these segments rotate around the hinge surfaces and stack into a compact form, and when unfolded, they are locked into the same plane through hinge positioning elements or locking tabs to restore the complete square (or other polygonal) panel. The hinge surfaces can be implemented using embedded metal hinges or integrally molded connecting bands, with the hinge and the connection surface of the main panel 100 secured firmly through through-fasteners or snap-fit components. To ensure structural rigidity when folded or unfolded, limit pins can be installed at the hinges to restrict the folding angle, and load-bearing reinforcement structures can be added on the panel's backside opposite the hinges to prevent fatigue from repeated folding. This hinged folding design reduces the size of the main panel 100 when not installed, significantly lowering transportation and storage volume. Once unfolded and locked during installation, its load-bearing and positioning functions maintain equivalent performance to non-foldable main panels.

Figure 2:
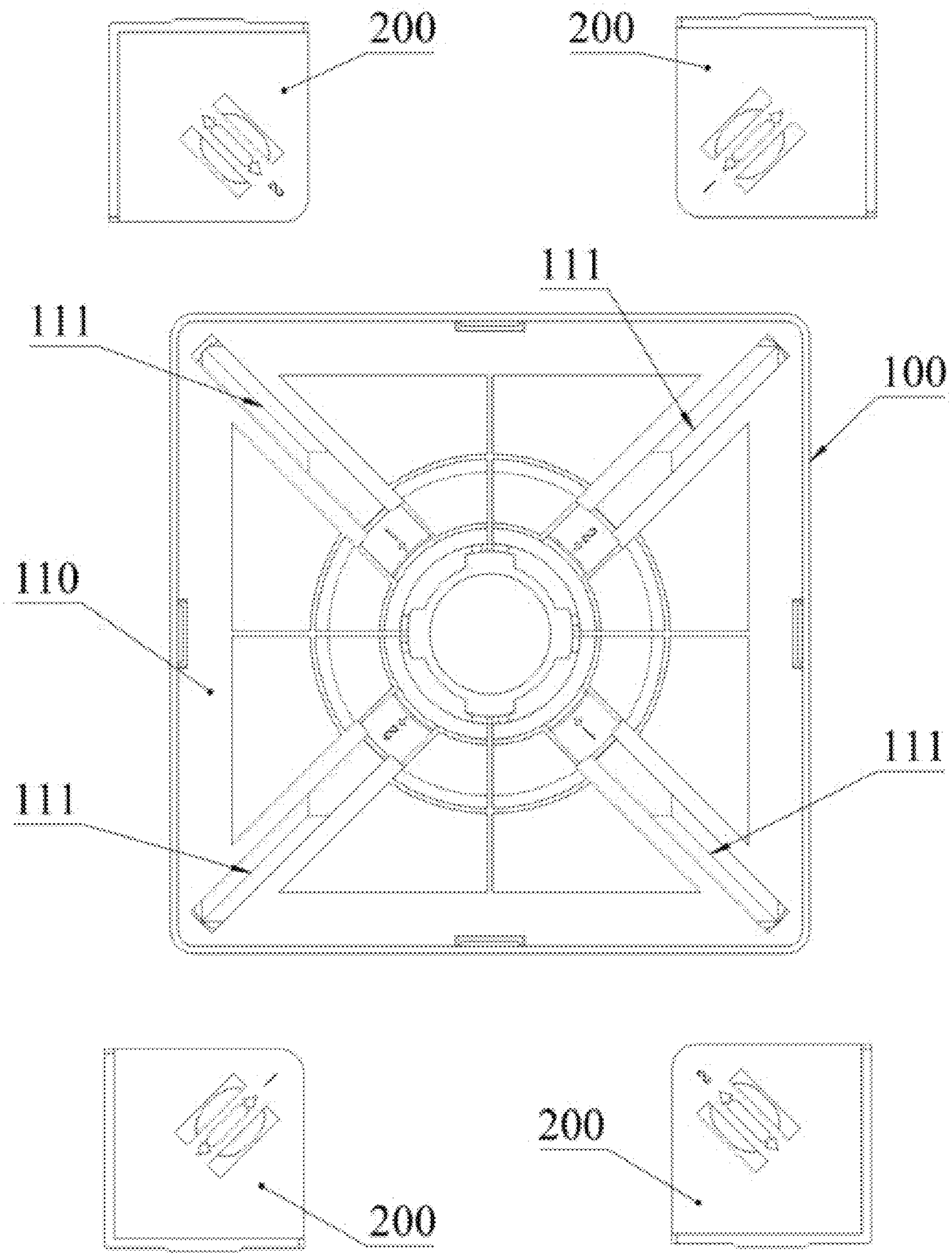
FIG. 2 is an exploded schematic view of the connection assembly in the embodiment of FIG. 1.
Figure 3:
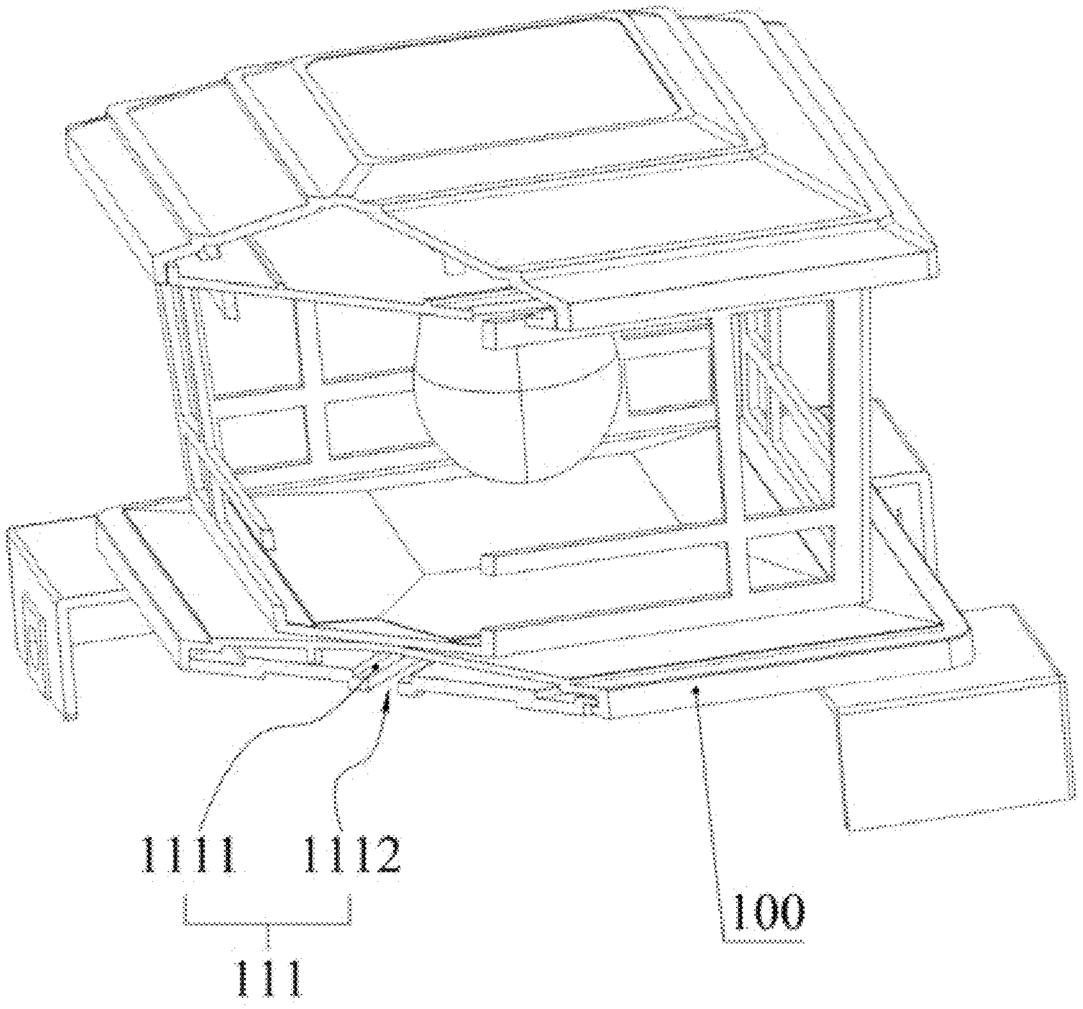
FIG. 3 is a cross-sectional view of the embodiment shown in FIG. 1.
Figure 4:
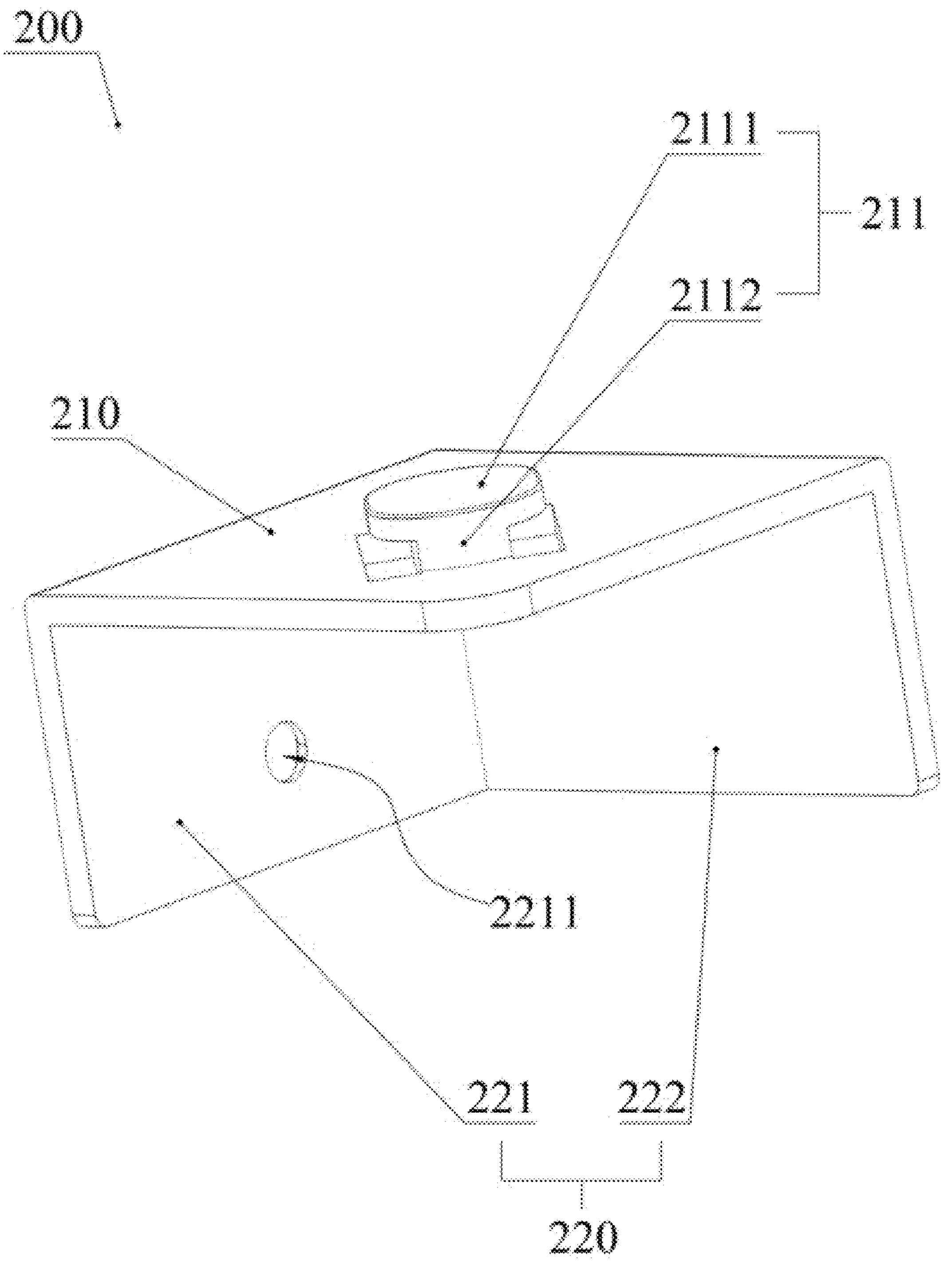
FIG. 4 is a perspective schematic view of the connection assembly in the embodiment shown in FIG. 2.
Figure 5:
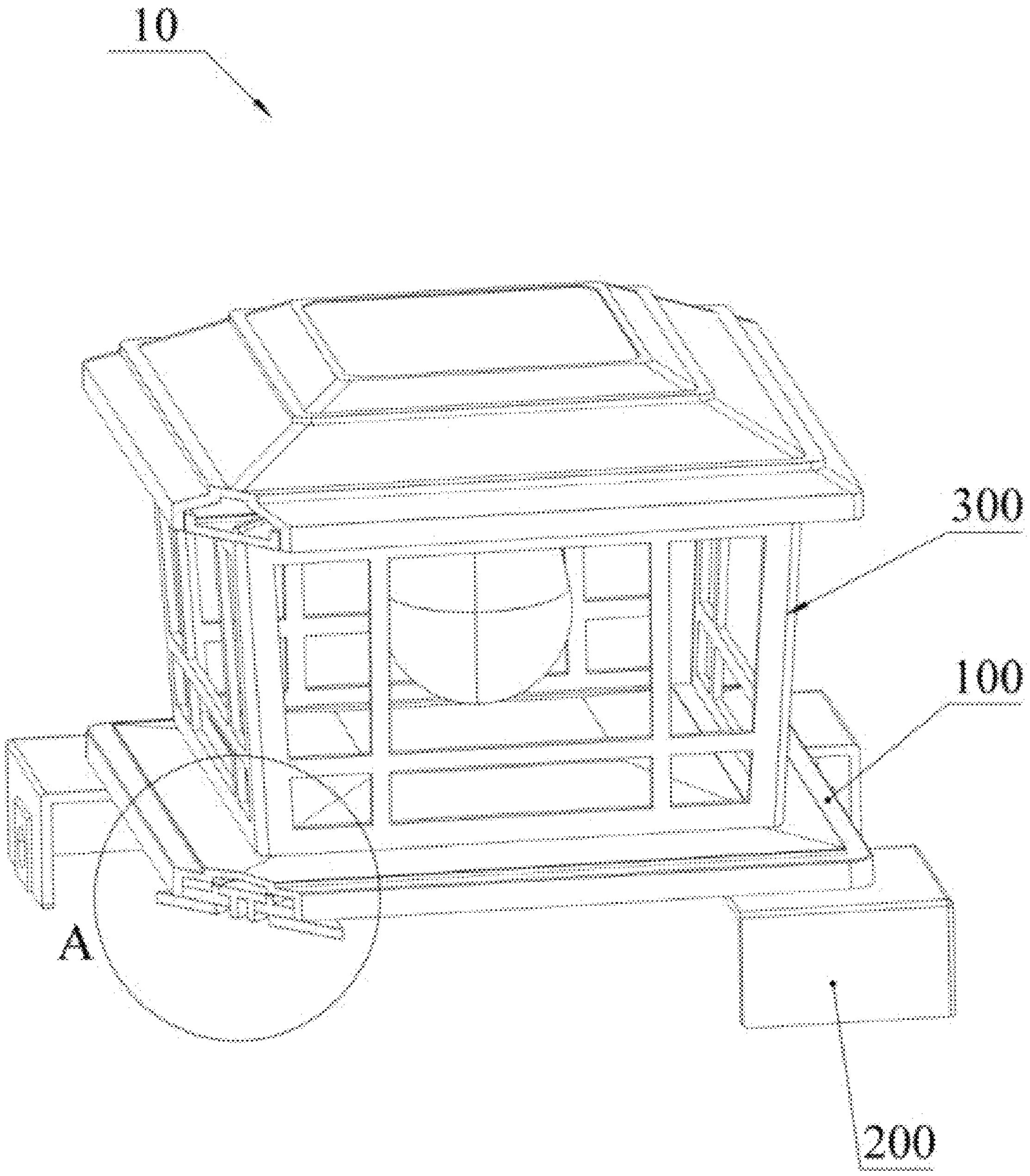
FIG. 5 is a cross-sectional view of the embodiment shown in FIG. 1.
Figure 6:
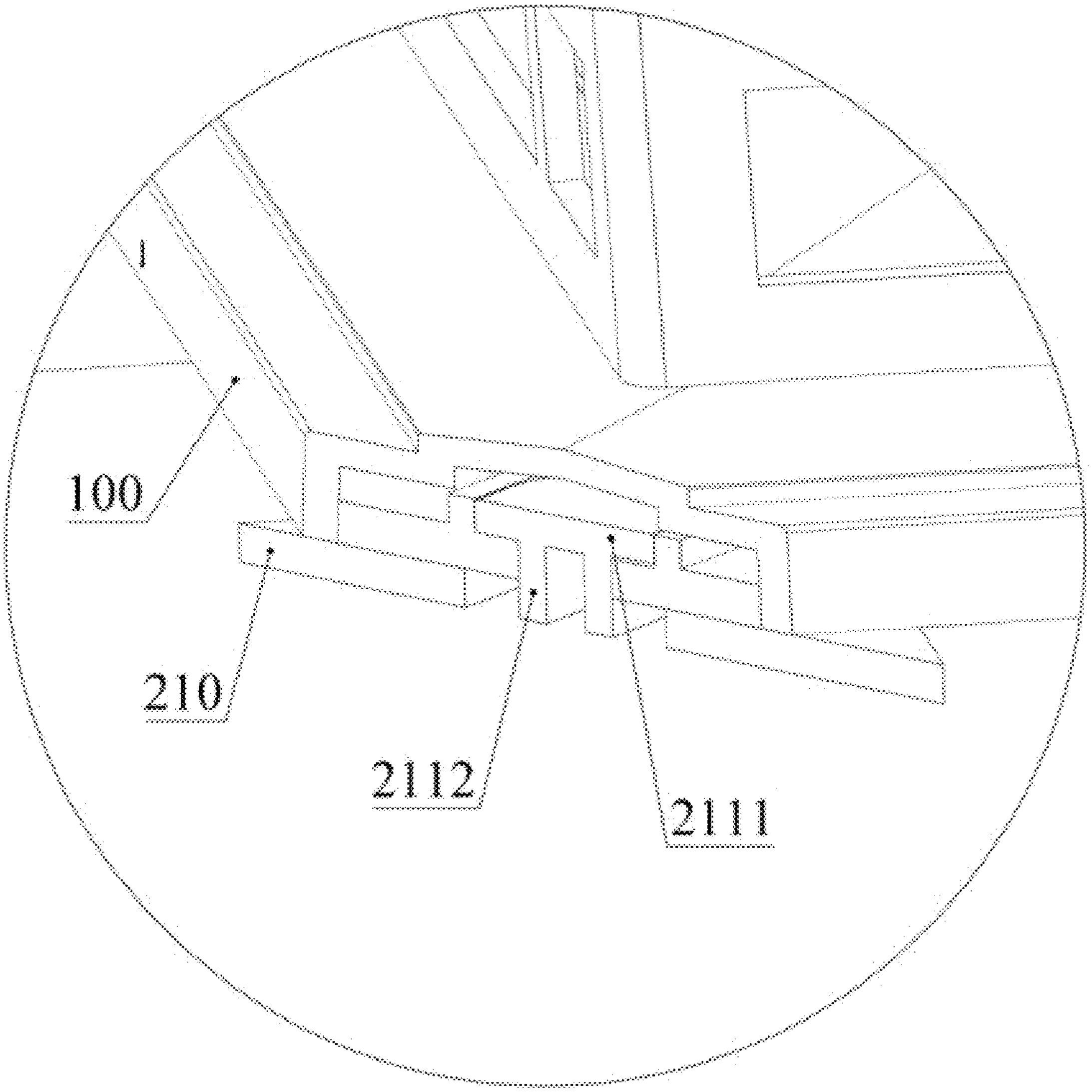
FIG. 6 is a partial enlarged view of section A in the embodiment shown in FIG. 5.

As shown in FIGS. 2 and 4, the connection assembly 200 is configured as a roughly square frame structure, including an abutment plate 210 and a locking plate 220. In a preferred embodiment of the present disclosure, the main panel 100 is a square plate, and four connection assemblies 200 are preferably arranged at the four corners of the main panel. The abutment plate 210 is designed to fit against the end face of the fence pillar head, providing initial positioning support between the connection assembly 200 and the fence to ensure accurate alignment during assembly. The locking plate 220 is arranged perpendicular to the abutment plate 210 and includes a first locking plate 221 and a second locking plate 222, which serve to achieve a stable and secure connection. After the main panel 100 and the connection assembly 200 are preliminarily aligned with the fence pillar head, the locking plate 220 can lock the connection state, preventing relative displacement or loosening of components during use, thereby ensuring the reliability and structural stability of the connection between the fence pillar head connector and the fence, and enhancing the overall sturdiness of the fence. Specifically, the first locking plate 221 is provided with a fastener receiving part, which, in the preferred embodiment of the present disclosure, is configured as a through hole structure. This through hole 2211 allows fasteners such as bolts or pins to pass through. Once the connection assembly 200 and the corresponding connection point on the fence are preliminarily positioned, bolts or pins can be inserted through the through hole 2211 of the locking plate 220 and engaged with matching connection structures (such as threaded holes or pin holes) on the fence. This further secures the relative position of the connection assembly 200 and the fence from a locking perspective, effectively preventing connection loosening caused by vibration, external forces, or other factors during long-term use, thereby strengthening the overall connection reliability and structural durability of the fence pillar head connector.

Please also refer to FIGS. 2, 3, 4, 5, and 6. The bottom surface of the main panel 100 serves as the mounting surface 110 for connecting with the connection assembly 200. The mounting surface 110 is equipped with four sliding grooves 111, each extending linearly from the central region of the mounting surface 110 toward the four corners of the main panel 100, forming a radial distribution and creating an "X"-shaped guiding structure. Specifically, each sliding groove 111 extends in a straight line, with its length matching the distance from the center of the mounting surface 110 to the corresponding corner. The cross-section of the groove is "T"-shaped, meaning the sliding groove 111 consists of a wider upper groove segment 1111 and a narrower lower groove segment 1112, which together form the T-shaped groove structure. The abutment plate 210 of the connection assembly 200 is correspondingly fitted with sliding blocks 211 that match the sliding grooves 111, forming a sliding fit structure. The sliding block 211 is entirely shaped as a "T" to match the sliding groove 111, including an upper sliding part 2111 and a lower sliding part 2112. The width of the upper sliding part 2111 matches the width of the upper groove segment 1111, while the width of the lower sliding part 2112 matches the width of the lower groove segment 1112. The upper sliding part 2111 and lower sliding part 2112 are vertically connected to form an integrated T-shaped structure.

During assembly, the upper sliding part 2111 of the sliding block 211 is embedded into the upper groove segment 1111 of the sliding groove 111, with their upper and lower surfaces forming face contact to ensure stability during sliding. The lower sliding part 2112 passes through the lower groove segment 1112, with its sidewalls in clearance fit with the inner walls of the lower groove segment 1112 (controlled within a range that allows smooth sliding without noticeable wobbling). Since the width of the upper sliding part 2111 is greater than that of the lower groove segment 1112, the sliding block 211 cannot disengage from the lower groove segment 1112, thereby providing reliable positioning in the direction perpendicular to the mounting surface 110 and preventing the connection assembly 200 from separating from the main panel 100. When adjusting the position of the connection assembly 200, the upper sliding part 2111 of the sliding block 211 moves along the upper groove segment 1111, while the lower sliding part 2112 moves synchronously along the lower groove segment 1112. The engagement of the two ensures that the connection assembly 200 can only be smoothly adjusted along the length of the sliding groove 111. The above engagement structure of the T-shaped groove and the T-shaped sliding block not only provides flexibility for adjusting the position of the connection assembly 200 to accommodate fence pillar heads of different cross-sectional dimensions but also ensures stability and connection reliability during adjustment, preventing radial displacement or loosening.

Figure 10:
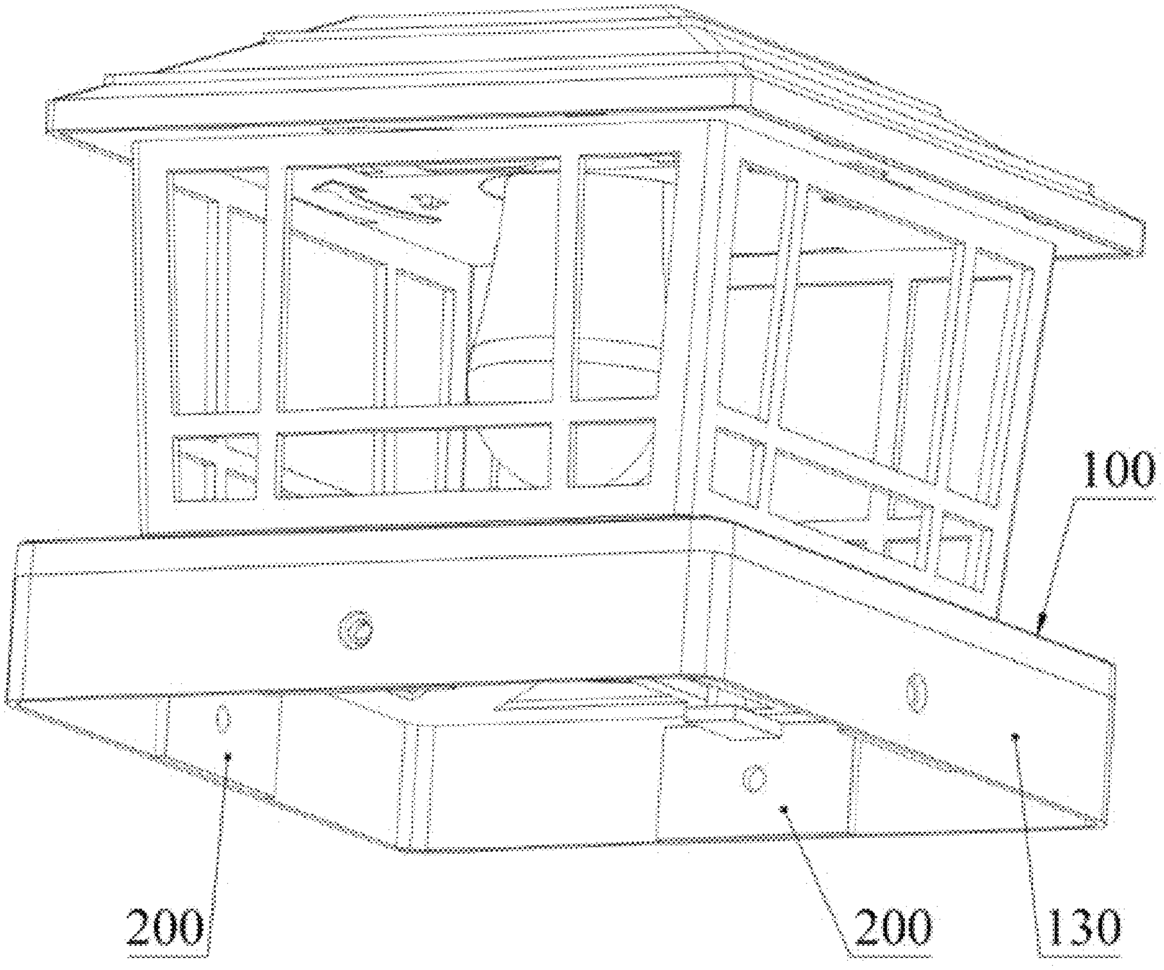
FIG. 10 is a perspective schematic diagram of another embodiment provided by the present invention.
Figure 11:
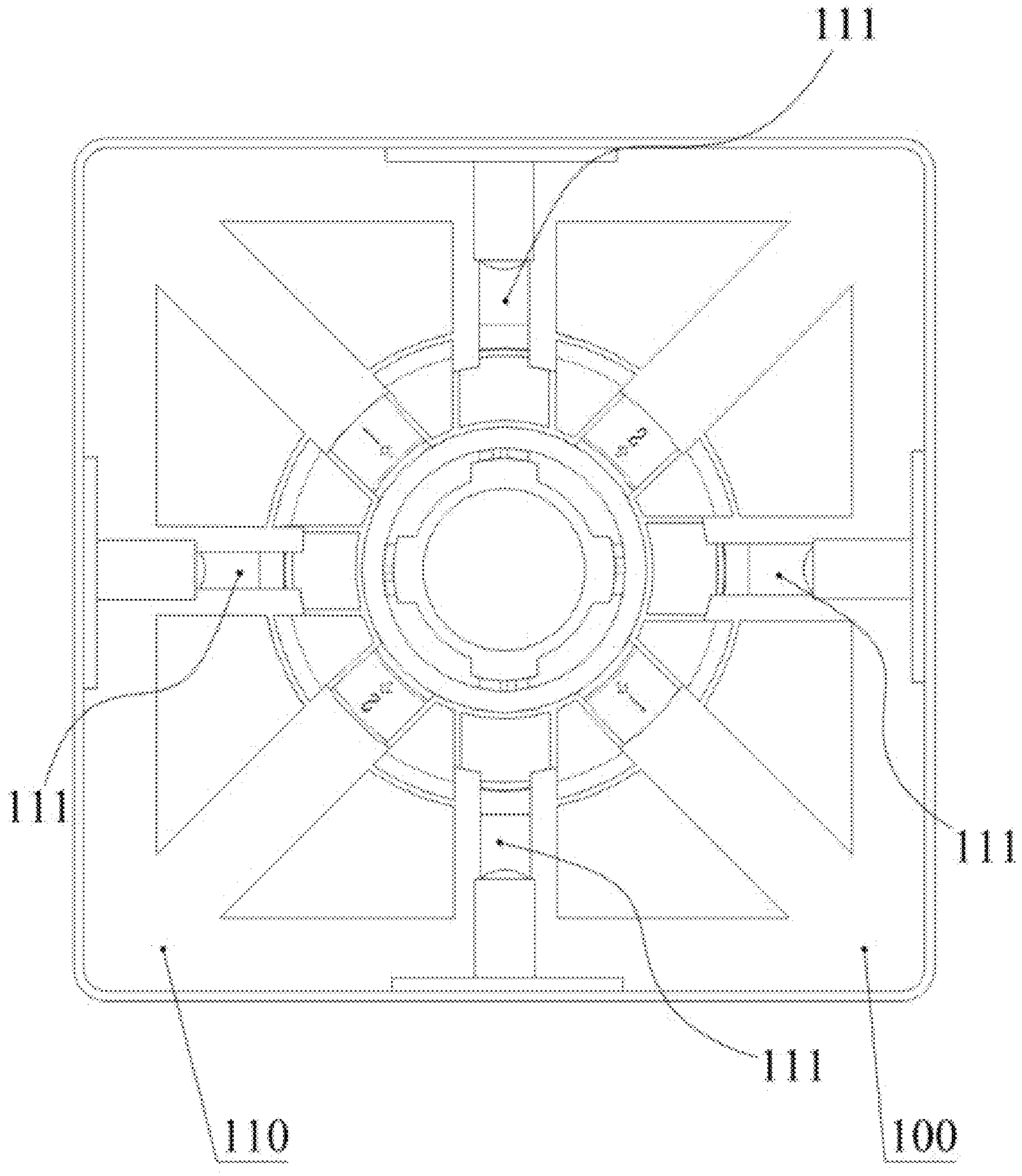
FIG. 11 is a bottom view of the embodiment shown in FIG. 10.
Figure 12:
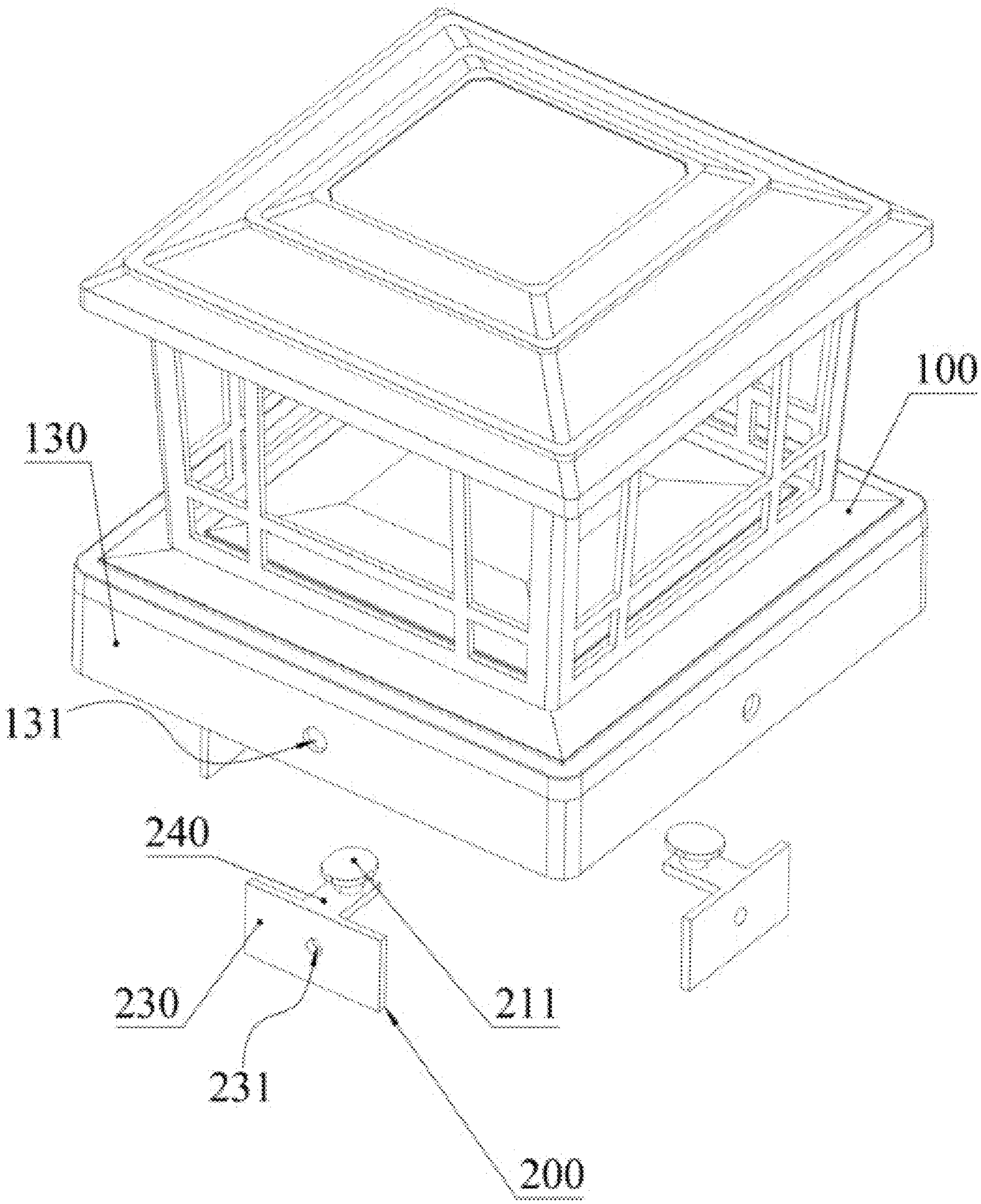
FIG. 12 is an exploded schematic diagram of the connection assembly in the embodiment shown in FIG. 10.

In other embodiments, as shown in FIGS. 10, 11, and 12, the main panel 100 is a polygonal plate structure, preferably a square plate structure. The connection assembly 200 is arranged on the four sides of the main panel 100, perpendicular to each side of the main panel 100, and configured as an L-shaped plate structure, including an integrally formed fixing plate 230 and connecting plate 240. Each side of the main panel 100 extends vertically downward from the panel surface toward the fence pillar head to form a baffle 130, which is perpendicular to the panel surface of the main panel 100. The baffle 130 is configured to form a bottom-opened, enclosed frame structure with the panel surface of the main panel 100, providing lateral protection for the connection assembly 200 and a connection support base. Specifically, the main panel 100 is provided with four sliding grooves 111, each extending from the central area of the mounting surface 110 toward the center of the four sides of the main panel 100, arranged radially to form a "cross"-shaped guiding structure. The connecting plate 240 is integrally formed with a sliding block 211, which is slidably engaged with the sliding groove 111, allowing the connection assembly 200 to move relative to the main panel 100 through the sliding of the sliding block 211 along the sliding groove 111. The baffle 130 is provided with a first connecting hole 131, which is a circular hole structure penetrating the baffle 130. The fixing plate 230 is provided with a second connecting hole 231 at a position corresponding to the first connecting hole 131, with an aperture adapted to the first connecting hole 131. When the connection assembly 200 is adjusted to a suitable position along the edge of the main panel 100 through the cooperation of the sliding block and sliding groove, fasteners (such as bolts or pins) can be sequentially passed through the first connecting hole 131 and the second connecting hole 231 to further lock the connection assembly 200 and the main panel 100. It should be noted that when the fixing plate 230 is in contact with the baffle 130, this configuration accommodates the maximum size of fence pillar heads allowed by the fence pillar head connector, adapting to larger-sized fence pillar heads on the market, thereby expanding the compatibility range of the fence pillar head connector and enhancing its universality. It also avoids the potential sliding risk that may arise from relying solely on the cooperation of the sliding block and sliding groove, further improving the overall structural reliability of the fence pillar head connector.

In other embodiments (not shown), the inner wall of the upper groove segment 1111 or lower groove segment 1112 of the sliding groove 111 is provided with equidistant positioning grooves (e.g., one positioning groove every 5 mm). Correspondingly, the sliding block 211 is equipped with an elastic ball on the outer or nearby bottom of its lower sliding part 2112. The ball, made of elastic material and embedded in the shell of the sliding block, can be compressed when not engaged in the groove to allow sliding. Upon reaching the corresponding position, it elastically rebounds and automatically embeds into the positioning groove to achieve snap-fit positioning. This positioning structure enables quick and reliable limitation through a plurality of discrete positioning points after size adjustment, preventing micro-movement or cumulative displacement caused by construction vibrations or wind loads, while retaining the reversibility of manually disengaging the ball and adjusting the position. The spacing of the positioning grooves, ball hardness, and spring preload can be adjusted according to the adaptation range and usage environment to balance installation convenience and vibration resistance.

In other embodiments (not shown), the sliding block 211 internally integrates a spring telescoping unit with its lower sliding part 2112. The spring telescoping unit enables the abutment plate 210 to exert a certain preload force on the fence pillar head after adjustment through axial elastic compression or extension, thereby achieving elastic adhesion. Specifically, one end of the spring telescoping unit is fixed to the internal shell of the sliding block 211, while the other end acts on the rear side of the abutment plate 210 or locking plate 220 through a thrust or limiting component. When the sliding block 211 is adjusted to the corresponding position of the pillar and released, the spring causes the abutment plate 210 to apply centripetal pre-pressure on the pillar to enhance frictional adhesion. The stroke, stiffness, and limiting settings of the spring telescoping unit should be designed in coordination with the cross-sectional variation range of the fence pillar head. An adjustable limiting ring can also be installed on the sliding block to restrict the maximum extension, avoiding local deformation caused by overpressure. This elastic unit not only provides better adaptability but also buffers external impact forces, improving the long-term stability of the connection.

In other embodiments (not shown), the outer side or visible area of the sliding groove 111 on the main panel 100 is marked with dimensional scale indicators (e.g., labeled with a 0-50 mm adaptation range or calibrated scale values based on actual design). The scales are displayed through engraving or printing. An indicator line or marker is placed on the top of the upper sliding part 2111 of the sliding block 211 or the visible edge of the abutment plate 210. When the sliding block 211 moves along the sliding groove 111, the indicator line aligns with the dimensional scale on the outer side of the main panel 100 to display the current radial offset or snap-fit dimension. The scale and the indicator line significantly cooperate to reduce the time and tools required for on-site measurement and repeated adjustments, enabling construction personnel to perform quick tuning and confirmation without additional measuring tools, thereby lowering installation costs and improving work efficiency.

In other embodiments (not shown), to enhance the bending and compression resistance of the main panel 100, triangular reinforcing ribs can be added circumferentially along the edges of the main panel 100 and at the connection points with the connection assembly 200. These triangular ribs are designed with an isosceles triangular cross-section along the edges of the main panel 100, where the base is welded or integrally formed with the panel surface, and the apex extends outward to form a thickened rib structure. Near the sliding groove 111, the triangular ribs can be locally densified to withstand concentrated stress during sliding adjustments or column head compression. By increasing the section modulus, the triangular ribs significantly improve the panel's stiffness and deformation resistance under radial forces, ensuring that the main panel 100 does not undergo permanent deformation during sliding block 211 adjustments or external force application. This maintains the geometric accuracy and long-term reliability of assembly references for the sliding groove 111 and buckle seat 120 and other components.

Figure 7:
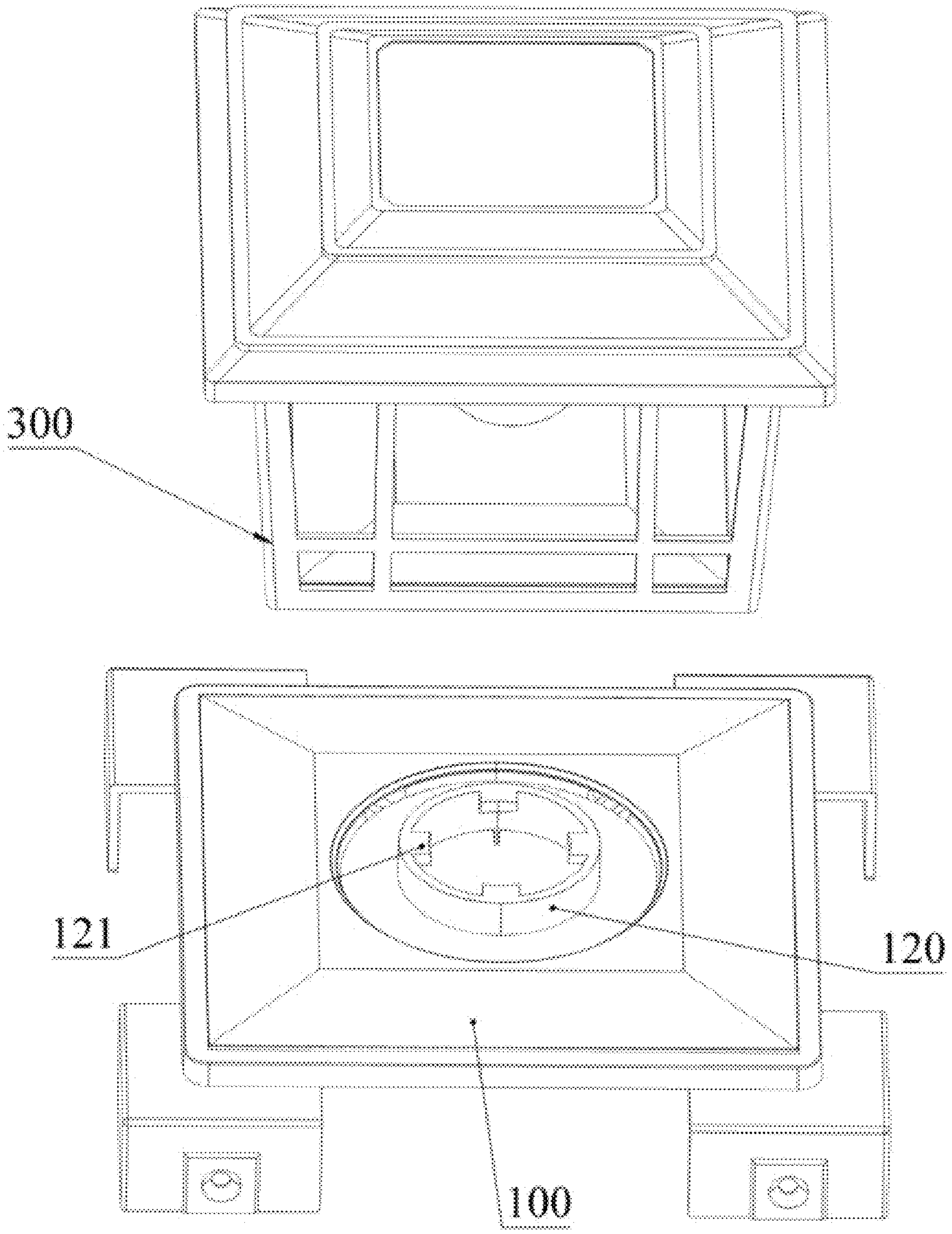
FIG. 7 is an exploded schematic view of the cover assembly in the embodiment shown in FIG. 1.
Figure 8:
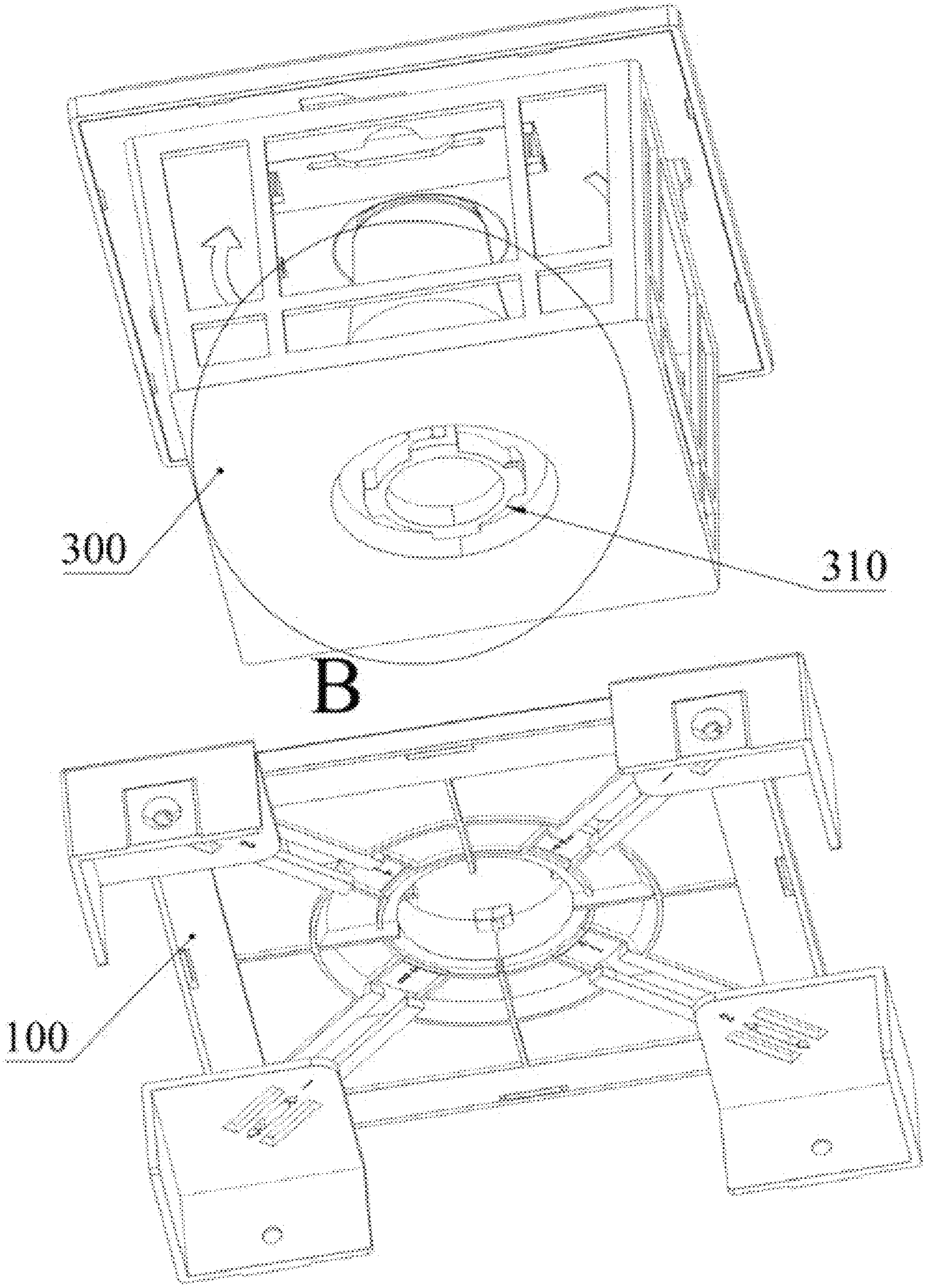
FIG. 8 is another schematic view of the embodiment shown in FIG. 7.
Figure 9:
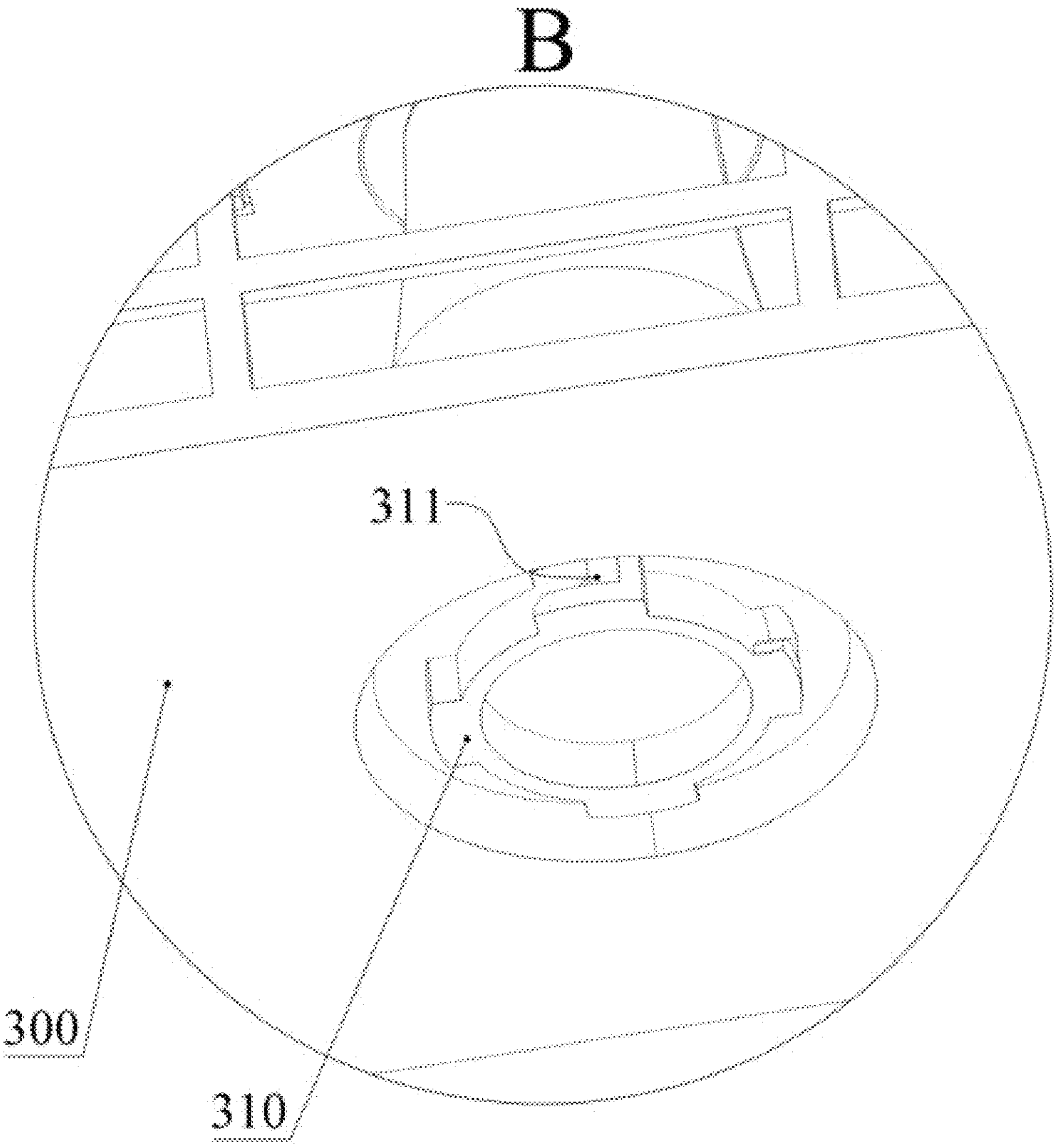
FIG. 9 is a partial enlarged view of section B in the embodiment shown in FIG. 8.

As shown in FIGS. 7, 8, and 9, the main panel 100 has a buckle seat 120 on its top surface opposite the mounting surface 110. The buckle seat 120 is configured as a ring, with a plurality of raised clamping blocks 121 spaced circumferentially along the inner wall of the buckle seat 120, each clamping block 121 being distributed uniformly. The bottom of the cover assembly 300 is integrally formed with an engagement part 310 at the position corresponding to the buckle seat 120. The outer wall of the engagement part 310 is circumferentially provided with clamping grooves 311 that match the clamping blocks 121 in number and shape. During assembly, the engagement part 310 of the cover assembly 300 is first aligned with the buckle seat 120 of the main panel 100, allowing the clamping blocks 121 and clamping grooves 311 for initial alignment. The cover assembly 300 is then rotated circumferentially until the clamping blocks 121 fully snap into the clamping grooves 311. At this point, the cover assembly 300 and the main panel 100 achieve circumferential positioning and axial fixation through the engagement of the clamping blocks 121 and clamping grooves 311, completing their quick connection. This rotating buckle structure eliminates the need for additional fasteners, simplifying assembly while ensuring the stability of the connection between the cover assembly 300 and the main panel 100. It also facilitates disassembly for internal inspection or maintenance.

In other embodiments (not shown), the fixation method between the main panel 100 and the cover assembly 300 is not limited to a buckle-type connection. Alternatives include magnetic fixation, threaded fixation, and more. For example, magnets or magnetic attachments can be embedded in corresponding positions of the main panel 100 and the cover assembly 300, enabling quick positioning and fixation of the cover assembly 300 through magnetic force, which is convenient for frequent disassembly without exposed fasteners. Alternatively, a threaded structure matching the engagement part 310 can be provided on the inner circumference of the buckle seat 120, allowing axial fixation under higher torque by screwing in or out. Another option is designing the engagement part 310 with a flip lock tab for secondary anti-release by flipping and locking. Different fixation methods can be used interchangeably or in combination to meet various environmental requirements (e.g., wind resistance, theft prevention, or convenient maintenance).

In a preferred embodiment of the present disclosure, referring to FIG. 1, the cover assembly 300 is configured as a box structure with an internal accommodation space, which is used to house a lamp. The lamp can be installed into this space through snap-fit or threaded connections. Through the cooperation of the cover assembly 300 and the main panel 100, the lamp is positioned at the top area of the fence pillar head, thereby providing illumination for the surrounding environment of the fence. In other embodiments, the cover assembly 300 is not limited to installing lamps. Depending on the actual application scenario and requirements, other decorative items such as decorative signage or artistic sculptural elements can also be installed, enriching the visual expression of the fence pillar head and enhancing the overall aesthetics and adaptability of the fence to meet diverse user preferences for fence decoration styles.

In summary, the present disclosure achieves the following technical effects: the sliding groove 111 on the bottom surface of the main panel 100 and the sliding block 211 of the connection assembly 200 form a sliding fit, allowing the connection assembly 200 to flexibly adjust its radial position along the sliding groove, which overcomes the size limitations of traditional fixed connectors, enabling broad compatibility with fence pillar heads of varying cross-sectional dimensions for user convenience; the through hole 2211 on the locking plate 220 of the connection assembly 200 allows bolts or pins to pass through and be engaged with the matching connection structure of the fence, further securing the relative position of the connection assembly 200 and the fence from a locking perspective, which effectively resists loosening caused by vibrations or external forces, significantly improving connection reliability and structural durability; the buckle seat 120 on the top surface of the main panel 100 and the engagement part 310 at the bottom of the cover assembly 300 form a rotating snap-fit structure, enabling quick installation and removal of the cover assembly 300 and the main panel 100 without additional fasteners, simplifying assembly and maintenance; additionally, the internal accommodation space of the cover assembly 300 can flexibly accommodate lamps or decorative elements, providing illumination for the fence surroundings while enhancing the visual appeal of the fence pillar head and improving adaptability to different scenarios.

In the description of the present disclosure, it should be appreciated that directional terms such as "front, rear, up, down, left, right", "horizontal, vertical, perpendicular, horizontal" and "top, bottom" etc. indicate the orientation or positional relationship based on the orientation or positional relationship shown in the drawings, and are only for the convenience of describing the present disclosure and simplifying the description. In the absence of a contrary explanation, these directional terms do not indicate or imply that the device or element referred to must have a specific orientation or be constructed and operated in a specific orientation, and therefore should not be understood as limiting the scope of protection of the present disclosure; the directional terms "inside, outside" refer to the inside and outside relative to the contour of each component itself.

For the convenience of description, spatial relative terms such as "on . . . ", "above . . . ", "on the upper surface of . . . ", "upper" etc. may be used here to describe the spatial positional relationship of a device or feature with other devices or features as shown in the drawings. It should be appreciated that spatial relative terms are intended to encompass different orientations of the device in use or operation other than the orientation described in the drawings. For example, if the device in the drawing is inverted, the device described as "above other devices or structures" or "on other devices or structures" will subsequently be positioned as "below other devices or structures" or "under other devices or structures". Thus, the exemplary term "above" can include both "above" and "below" orientations. The device can also be positioned in other different ways (rotated 90 degrees or in other orientations), and the spatial relative descriptions used here should be interpreted accordingly.

In addition, it should be noted that the use of terms such as "first", "second" etc. to define components is for the convenience of distinguishing the corresponding components. Unless otherwise stated, the above terms have no special meaning, and therefore should not be understood as limiting the scope of protection of the present disclosure.

The above description is only a preferred embodiment of the present disclosure and is not intended to limit the present disclosure. For those skilled in the art, the present disclosure can have various modifications and changes. Any modifications, equivalent replacements, improvements etc. made within the spirit and principles of the present disclosure should be included within the scope of protection of the present disclosure.

What is claimed is:

1. A fence pillar head connector, comprising:

a main panel configured to be mounted to an end face of a fence pillar, the main panel comprising a mounting surface facing the fence pillar;

at least one sliding groove formed on the mounting surface of the main panel; and at least one connection assembly, comprising an abutment plate coupled to the fence pillar;

wherein the abutment plate comprises a sliding block slidably engaged with the sliding groove, enabling the at least one connection assembly to move relative to the main panel through sliding of the sliding block along the sliding groove, thereby adjusting a position of the abutment plate to accommodate fence pillars of different cross-sectional dimensions.

2. The fence pillar head connector according to claim 1, wherein the sliding groove has a T-shaped cross-section, comprising an upper groove segment and a lower groove segment.

3. The fence pillar head connector according to claim 2, wherein the sliding block is configured as a T-shaped structure, comprising an upper sliding part and a lower sliding part, the upper sliding part being embedded in the upper groove segment of the sliding groove to form surface contact, and the lower sliding part passing through the lower groove segment of the sliding groove with a clearance fit.

4. The fence pillar head connector according to claim 1, wherein the main panel is of a square plate structure, with four sliding grooves, each radiating from a central region of the mounting surface toward four corners of the main panel.

5. The fence pillar head connector according to claim 4, wherein there are four connection assemblies.

6. The fence pillar head connector according to claim 1, wherein the connection assembly further comprises at least one locking plate arranged perpendicular to the abutment plate.

7. The fence pillar head connector according to claim 6, wherein the connection assembly comprises a first locking plate and a second locking plate; and the first locking plate is formed with a fastener receiving part configured to fix the connection assembly to the fence pillar when the connection assembly is in a target position.

8. The fence pillar head connector according to claim 7, wherein the fastener receiving part is a through hole.

9. The fence pillar head connector according to claim 1, wherein the main panel is a polygonal plate-shaped structure, with the connection assembly disposed on an edge of the main panel and perpendicular to each edge of the main panel, and the sliding groove extends from the central region of the mounting surface towards the center of each edge of the main panel;

the connection assembly comprises a fixing plate and a connecting plate, wherein the fixing plate is configured to connect with the fence pillar head, and the connecting plate is integrally formed with a sliding block that is slidably coupled to the sliding groove; and the main panel further comprises a baffle that vertically extends downward from a panel surface of the main panel toward the fence pillar head and is perpendicular to the panel surface of the main panel.

10. The fence pillar head connector according to claim 1, further comprising a cover assembly, wherein the cover assembly comprises an engagement part, the main panel comprises a buckle seat, and the cover assembly is engaged with the buckle seat through the engagement part, thereby being releasably fixed to the main panel.

11. A fence pillar head connector, comprising:

a main panel configured to be mounted to an end face of a fence pillar, the main panel comprising a mounting surface facing the fence pillar;

at least one sliding groove formed on the mounting surface of the main panel; and at least one connection assembly, comprising an abutment plate coupled to the fence pillar;

wherein the abutment plate comprises a sliding block slidably engaged with the sliding groove, allowing the connection assembly to move relative to the main panel through the sliding of the sliding block along the sliding groove, thereby adjusting a position of the abutment plate to accommodate fence pillar heads of different cross-sectional dimensions; and the connection assembly further comprises a locking plate, the locking plate being formed with a fastener receiving part configured to fix the connection assembly to the fence pillar when the connection assembly is in a target position.

12. The fence pillar head connector according to claim 11, wherein the connection assembly comprises at least one locking plate arranged perpendicular to the abutment plate.

13. The fence pillar head connector according to claim 12, wherein the connection assembly comprises a first locking plate and a second locking plate.

14. The fence pillar head connector according to claim 13, wherein the first locking plate is formed with a fastener receiving part, the fastener receiving part being a through hole.

15. The fence pillar head connector according to claim 11, wherein the sliding groove has a T-shaped cross-section, comprising an upper groove segment and a lower groove segment; and the sliding block is configured as a T-shaped structure, comprising an upper sliding part and a lower sliding part, the upper sliding part being embedded in the upper groove segment of the sliding groove to form surface contact, and the lower sliding part passing through the lower groove segment of the sliding groove in clearance fit.

16. A fence pillar head connector, comprising:

a main panel configured to be mounted to an end face of a fence pillar, the main panel comprising a mounting surface facing the fence pillar and a buckle seat;

at least one sliding groove formed on the mounting surface of the main panel;

at least one connection assembly, comprising an abutment plate coupled to the fence pillar;

wherein the abutment plate comprises a sliding block slidably engaged with the sliding groove, allowing the at least one connection assembly to move relative to the main panel through sliding of the sliding block along the sliding groove, thereby adjusting a position of the abutment plate to accommodate fence pillars of different cross-sectional dimensions; and a cover assembly, comprising an engagement part, wherein the cover assembly is engaged with the buckle seat through the engagement part, thus being releasably fixed to the main panel.

17. The fence pillar head connector according to claim 16, wherein a plurality of raised clamping blocks are spaced circumferentially along an inner wall of the buckle seat.

18. The fence pillar head connector according to claim 17, wherein an outer peripheral wall of the engagement part is formed with a plurality of clamping grooves adapted to the plurality of clamping blocks.

19. The fence pillar head connector according to claim 18, wherein the cover assembly achieves releasable fixation by aligning the engagement part with the buckle seat and performing a circumferential rotating motion to allow the clamping blocks and clamping grooves to interlock.

20. The fence pillar head connector according to claim 16, wherein the cover assembly is configured as a box structure with an internal accommodation space, and the accommodation space is designed to accommodate a lamp.

* * * * *